(12) United States Patent
Mielke et al.

(10) Patent No.: US 12,381,843 B2
(45) Date of Patent: *Aug. 5, 2025

(54) TECHNIQUES FOR TEMPLATED DOMAIN MANAGEMENT

(71) Applicant: NETFLIX, INC., Los Gatos, CA (US)

(72) Inventors: Adam Mielke, San Francisco, CA (US); Donavan Fritz, Los Gatos, CA (US); Phelps Williams, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/553,089

(22) Filed: Dec. 16, 2021

(65) Prior Publication Data

US 2022/0109653 A1 Apr. 7, 2022

Related U.S. Application Data

(63) Continuation of application No. 16/995,710, filed on Aug. 17, 2020, now Pat. No. 11,223,599.

(51) Int. Cl.
*H04L 29/12* (2006.01)
*G06F 16/955* (2019.01)
*H04L 9/40* (2022.01)
*H04L 29/08* (2006.01)
*H04L 61/4511* (2022.01)
*H04L 61/5007* (2022.01)
(Continued)

(52) U.S. Cl.
CPC ...... *H04L 61/4511* (2022.05); *G06F 16/9566* (2019.01); *H04L 61/5007* (2022.05); *H04L 63/0823* (2013.01); *H04L 67/02* (2013.01)

(58) Field of Classification Search
CPC ............. H04L 61/4511; H04L 61/5007; H04L 63/0823; H04L 67/02; H04L 29/12; H04L 29/08; H04L 61/1511; H04L 67/10; G06F 16/9566
USPC ........................................................ 709/245
See application file for complete search history.

(56) References Cited

U.S. PATENT DOCUMENTS

| 6,421,732 | B1 | 7/2002 | Alkhatib et al. |
| 7,080,158 | B1* | 7/2006 | Squire ..................... H04L 67/02 709/245 |
| 7,720,997 | B1 | 5/2010 | Gourlay et al. |

(Continued)

*Primary Examiner* — Jude Jean Gilles
(74) *Attorney, Agent, or Firm* — Artegis Law Group, LLP (57) ABSTRACT

In various embodiments, a templated Domain Name System (DNS) nameserver respond to DNS to DNS requests, and a templated HyperText Transfer Protocol (HTTP) server respond to HTTP and Hypertext Transfer Protocol Secure (HTTPS) requests. The templated DNS nameserver responds to a DNS request with a predefined response specifying an Internet Protocol (IP) address associated with the templated HTTP server, based on a type of the DNS request. The templated HTTP server responds to an HTTP or HTTPS request with a redirection response specifying a default redirection Universal Resource Locator (URL), or a different URL if the default has been overridden. Domain management is simplified relative to conventional approaches using the templated DNS nameserver and the templated HTTP server. A new domain can simply be registered at a domain name registrar, and the templated DNS nameserver configured as an authoritative DNS nameserver at the domain name registrar.

20 Claims, 8 Drawing Sheets

(51) Int. Cl.
*H04L 67/02* (2022.01)
*H04L 67/10* (2022.01)

(56) References Cited

U.S. PATENT DOCUMENTS

| | | | |
|---|---|---|---|
| 7,783,757 B2 | 8/2010 | Plamondon | |
| 8,769,057 B1* | 7/2014 | Breau | H04L 61/103 |
| | | | 709/222 |
| 9,300,623 B1* | 3/2016 | Earl | H04L 61/58 |
| 10,362,057 B1* | 7/2019 | Wu | H04L 63/1408 |
| 10,492,134 B2* | 11/2019 | Shimojou | H04W 40/02 |
| 10,686,826 B1* | 6/2020 | Goutal | G06F 18/2178 |
| 11,223,599 B1* | 1/2022 | Mielke | H04L 63/0823 |
| 11,297,032 B2* | 4/2022 | Koshal | H04L 61/4511 |
| 2006/0242321 A1 | 10/2006 | Hegde et al. | |
| 2008/0140847 A1 | 6/2008 | Almog | |
| 2008/0228938 A1 | 9/2008 | Plamondon | |
| 2008/0229017 A1 | 9/2008 | Plamondon | |
| 2011/0035469 A1* | 2/2011 | Smith | H04L 61/4511 |
| | | | 709/225 |
| 2011/0110235 A1* | 5/2011 | Ukita | H04L 67/563 |
| | | | 370/252 |
| 2012/0099429 A1* | 4/2012 | Ludwig | H04W 28/24 |
| | | | 370/235 |
| 2013/0191915 A1 | 7/2013 | Antonakakis et al. | |
| 2013/0205035 A1* | 8/2013 | Chen | H04L 61/251 |
| | | | 709/230 |
| 2014/0006577 A1* | 1/2014 | Joe | H04L 61/4511 |
| | | | 709/223 |
| 2014/0068043 A1* | 3/2014 | Archbold | H04L 61/4511 |
| | | | 709/223 |
| 2014/0317312 A1 | 10/2014 | Mitchell et al. | |
| 2015/0332329 A1* | 11/2015 | Luo | H04W 4/21 |
| | | | 705/14.58 |
| 2015/0350154 A1* | 12/2015 | Myla | H04L 67/01 |
| | | | 709/245 |
| 2016/0021114 A1* | 1/2016 | Lu | H04L 61/4511 |
| | | | 726/1 |
| 2016/0036943 A1* | 2/2016 | Kish | H04L 61/4511 |
| | | | 709/203 |
| 2016/0182441 A1* | 6/2016 | Gupta | H04L 61/3025 |
| | | | 709/245 |
| 2016/0308818 A1* | 10/2016 | Torres | H04B 7/2126 |
| 2016/0316006 A1* | 10/2016 | Zhang | H04L 61/4511 |
| 2017/0027541 A1* | 2/2017 | Henderson | A61B 8/4405 |
| 2017/0237706 A1 | 8/2017 | Wei | |
| 2018/0007088 A1* | 1/2018 | Kuznetsov | H04L 63/1483 |
| 2018/0041470 A1* | 2/2018 | Schultz | H04L 63/0263 |
| 2018/0167363 A1* | 6/2018 | Jain | H04L 63/0218 |
| 2018/0205734 A1* | 7/2018 | Wing | H04L 63/20 |
| 2019/0020663 A1* | 1/2019 | Bartos | G06N 20/00 |
| 2019/0114416 A1* | 4/2019 | Komarek | H04L 63/1425 |
| 2019/0182203 A1* | 6/2019 | Vig | H04M 15/85 |
| 2019/0208572 A1* | 7/2019 | Wang | H04W 80/10 |
| 2019/0268309 A1 | 8/2019 | Govindarajan et al. | |
| 2019/0313468 A1 | 10/2019 | Talebi Fard et al. | |
| 2019/0394233 A1* | 12/2019 | Li | H04L 63/1416 |
| 2021/0029074 A1* | 1/2021 | Buck | H04L 63/0236 |

* cited by examiner

TECHNIQUES FOR TEMPLATED DOMAIN MANAGEMENT

CROSS-REFERENCE TO RELATED APPLICATIONS

This application is a continuation of the co-pending U.S. patent application titled, "TECHNIQUES FOR TEMPLATED DOMAIN MANAGEMENT," filed on Aug. 17, 2020 and having Ser. No. 16/995,710. The subject matter of this related application is hereby incorporated herein by reference.

BACKGROUND

Field of the Invention

Embodiments of the present disclosure relate generally to computer networking and, more specifically, to techniques for templated domain management.

Description of the Related Art

Domains, which are also sometimes referred to as "domain names," are sequences of alphanumeric characters, such as example.com, that can be used to identify websites on the Internet. Domains are typically purchased from a domain name registrar and define realms of administrative autonomy, authority, or control within the Internet. A domain name registrar is an entity that manages reservations of Internet domains.

Businesses oftentimes purchase large numbers of domains from domain name registrars. For example, an owner of example.com could purchase various misspellings of the domain, such as example.com and example.com, and redirect the misspelled domains to example.com. Domains other than misspellings, such as those associated with marketing websites, could also be redirected to example.com. In such cases, the misspelled or other domains need to be configured in the same manner to redirect to a single domain, such as example.com.

Figure 1:
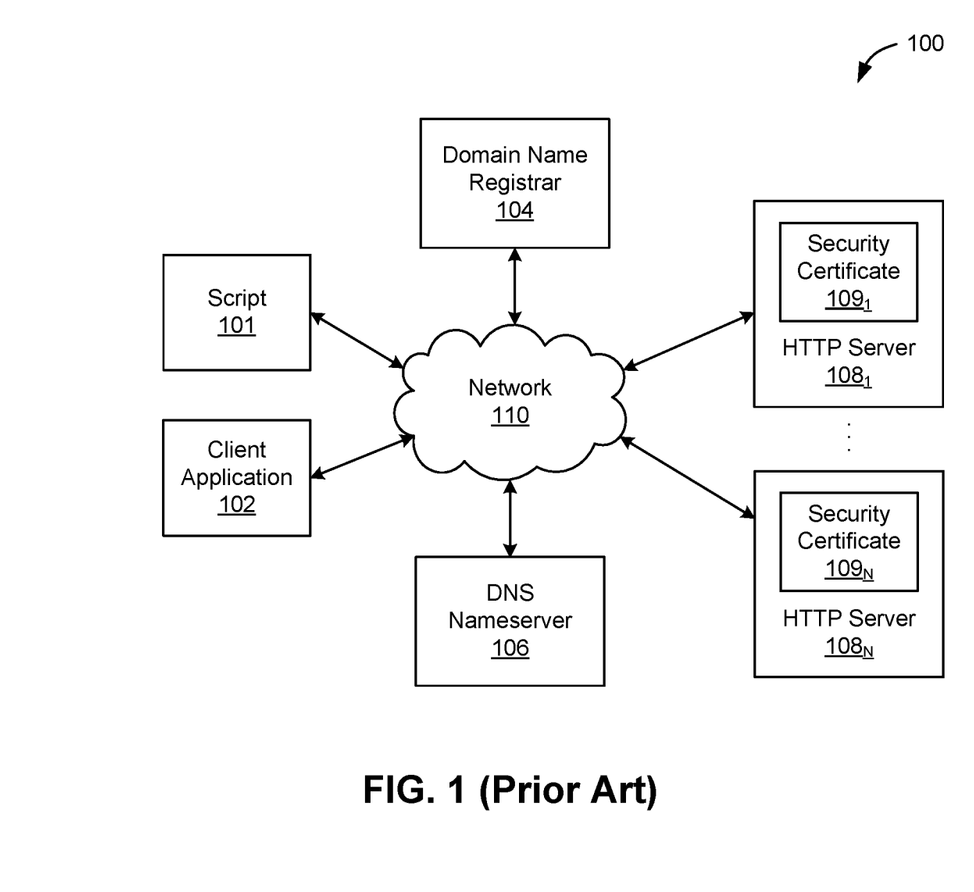
FIG. 1 is a conceptual illustration of a system for implementing HTTP redirection, according to the prior art.
Figure 2:
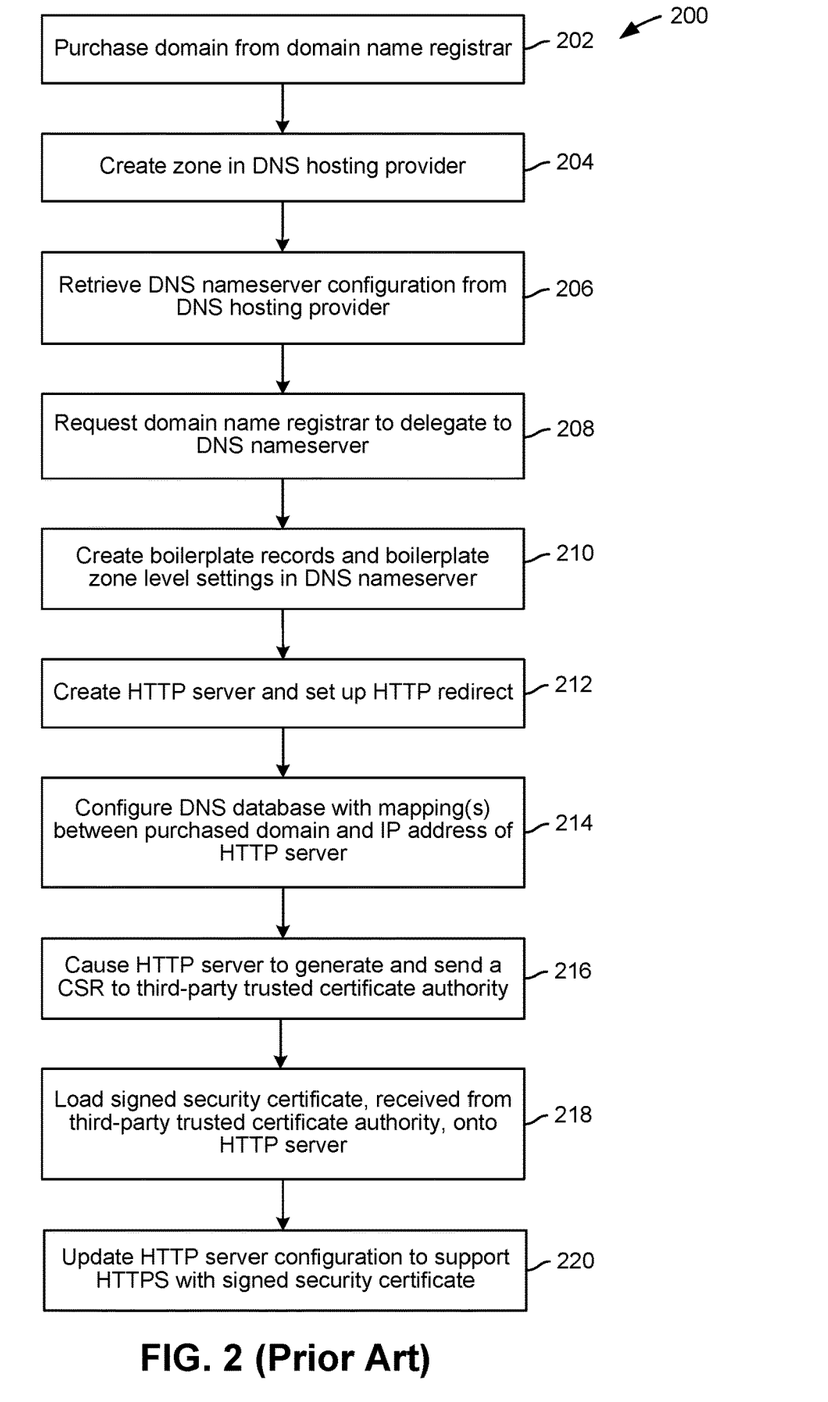
FIG. 2 illustrates a flow diagram of method steps for configuring a domain to redirect to another domain within the system of FIG. 1, according to the prior art.

One approach for configuring multiple domains to redirect to a single domain involves creating separate domain name system (DNS) zones and HyperText Transfer Protocol (HTTP) servers for each of the multiple domains, either manually or via an automated process. FIG. 1 is a conceptual illustration of a system 100 configured to implement such an approach, where one or more domains are redirected to another domain, according to the prior art. As shown, a script 101, a client application 102, a domain name registrar 104, a DNS nameserver 106, and multiple HTTP servers 108 are in communication over a network 110, such as the Internet. The HTTP servers 108, which include corresponding security certificates 109, are referred to herein collectively as HTTP servers 108 and individually as an HTTP server 108. Although described herein primarily with respect to HTTP servers that include security certificates, it should be noted that HTTP servers are not required to have security certificates. However, HTTP servers without security certificates would not support Hypertext Transfer Protocol Secure (HTTPS).

The script 101 can be executed to purchase a domain from the domain name registrar 104, set up a DNS configuration that directs DNS requests for the domain to the DNS nameserver 106, and create one of the HTTP servers 108 for redirecting HTTP and HTTPS requests, as described in greater detail in conjunction with FIG. 2.

FIG. 2 illustrates a flow diagram of method steps for configuring a domain to redirect to another domain within system 100 of FIG. 1, according to the prior art. As shown, a method 200 begins at step 202, where an operator purchases a domain from the domain name registrar 104. The operator can be, e.g., an administrator or an automated process such as the script 101.

At step 204, the operator creates a DNS zone in a DNS hosting provider. DNS hosting providers run DNS nameservers, which typically include databases of mappings between domains and public Internet Protocol (IP) addresses. Such DNS nameservers can be queried by client applications, such as the client application 102, to obtain IP addresses, which can in turn be used to communicate with servers associated with the domains.

At step 206, the operator retrieves a DNS nameserver configuration associated with the newly-created DNS zone from the DNS hosting provider.

Assuming the DNS nameserver configuration that is retrieved at step 206 specifies the DNS nameserver 106, then at step 208, the operator requests that the domain name registrar 104 delegate the domain purchased at step 202 to the DNS nameserver 106. For example, the domain name registrar 104 could be configured to delegate to the DNS nameserver 106 by configuring name server (NS) records maintained by the domain name registrar 104 to point to the DNS nameserver 106. NS records indicate which DNS nameservers are authoritative for particular domains. Subsequent to such a delegation, the DNS nameserver 106 will be the authoritative DNS nameserver for the domain purchased at step 202. Creating a DNS zone in a DNS hosting provider and requesting that the domain name registrar 104 delegate to the DNS nameserver 106, according to steps 204-208, establishes a distinct and contiguous portion of a domain space in the DNS for which administrative responsibility is designated to the owner of the domain purchased at step 202.

At step 210, the operator creates boilerplate records and boilerplate zone level settings in the DNS nameserver 106. Boilerplate records are standard records that are included in a DNS zone and allow a server to be used as a DNS nameserver. It should be understood that different organizations can use different boilerplate records and boilerplate zone level settings that meet security standards and functional requirements of those organizations. Examples of boilerplate records include security records such as Sender Policy Framework (SPF), DomainKeys Identified Mail (DKIM), and Certification Authority Authorization (CAA) records that are used to prevent takeover and misuse of the domain by malicious actors; records that establish email routing rules for the domain; records that point certain hostnames at standard HTTP servers for the organization; etc. An example boilerplate zone level setting is not allowing DNS zone transfers AXFR requests.

Steps 202-210 establish a DNS configuration such that Internet traffic to the domain purchased at step 202 is directed to a particular HTTP endpoint. At step 212, the operator creates an HTTP server 108 to serve as the HTTP endpoint and sets up an HTTP redirect. Creating an HTTP server can include, e.g., deploying a virtual machine or deploying a virtual host on an existing HTTP server. The HTTP server 108 is responsible for responding to HTTP and HTTPS requests for a hostname, corresponding to the domain purchased at step 202, with an HTTP redirect response that specifies a redirection universal resource locator (URL). For example, the HTTP server 108 could redirect misspellings such as exampel.com and example.com to example.com. A hostname is a domain assigned to a particular host computer, such as a server, and HTTP and HTTPS requests often include hostnames because a single IP address can be used to accept requests for multiple DNS hostnames. In contrast to a host name, a domain is a namespace that can be purchased, and multiple hostnames within a domain can be configured to point to the same HTTP server.

At step 214, the operator configures the database included in the DNS nameserver 106 to include mapping(s) between the domain purchased at step 202 and an IP address associated with the HTTP server 108 created at step 212. For example, example.com and www.example.com could be configured as mapping to the HTTP server 108. As a result, the DNS nameserver 106 will respond to DNS requests for the domain purchased at step 202 with the IP address associated with the HTTP server 108.

At step 216, the operator causes the HTTP server 108 to generate and send a certificate signing request (CSR) to a third-party trusted certificate authority. In particular, the HTTP server 108 can generate a private key that is to be used for a hostname, after which the HTTP server 108 generates the CSR from the private key and sends the CSR to the third-party trusted certificate authority. In turn, the third-party certificate authority generates the signed security certificate 109 that matches the private key and returns the signed security certificate 109 to the HTTP server 108.

At step 218, the operator loads the signed security certificate 109 onto the HTTP server 108. Then, at step 220, the operator updates the HTTP server 108 configuration to support HTTPS with the signed security certificate 109. Thereafter, the signed security certificate 109 can be used to authenticate the identity of the HTTP server 108 to client applications, such as the client application 102, for HTTPS requests. In addition, ongoing maintenance may be performed by requesting a renewed certificate from the certificate authority prior to expiration of the security certificate 109, loading the renewed certificate onto the HTTP server 108, and repeating these steps for the lifetime of the domain ownership.

One drawback of the above approach is that, for each domain, the same or similar configuration needs to be set up and a new HTTP server created, according to steps 204-220 of the method 200 described above, which is duplicative and inefficient. In addition, any changes to the same (or the similar) configuration that is set up for multiple domains may need to be made multiple times, once for each instance of the configuration. For example, to prevent a security vulnerability, a configuration change to limit the third-party certificate authorities that are permitted to issue security certificates could be made, at the DNS nameserver 106 and/or HTTP servers 108, to multiple instances of the same (or similar) configuration that are created for different domains.

As the foregoing illustrates, what is needed in the art are more effective techniques for domain management and HTTP redirection.

SUMMARY OF THE EMBODIMENTS

One embodiment of the present disclosure sets forth a computer-implemented method for processing Domain Name System (DNS) requests. The method includes receiving a DNS request specifying a domain, and determining a type of the DNS request. The method further includes responding to the DNS request with a predefined Internet Protocol (IP) address that is based on the type of the DNS request. When responding, the domain is not mapped to the predefined IP address.

Another embodiment of the present disclosure sets forth a computer-implemented method for processing HyperText Transfer Protocol (HTTP) requests and Hypertext Transfer Protocol Secure (HTTPS) requests. The method includes receiving, from a client application, a first request specifying a first hostname. The method further includes, in response to determining that the first request is an HTTPS request: determining whether the security certificate associated with the first hostname is stored in a cache and has not expired, if the security certificate is stored in the cache and has not expired, transmitting the security certificate stored in the cache and a redirection response to the client application, and if the security certificate is not stored in the cache or a stored security certificate has expired: generating the security certificate, storing the security certificate in the cache, and transmitting the security certificate and the redirection response to the client application. In addition, the method includes, in response to determining that the first request is an HTTP request, transmitting the redirection response to the client application.

Another embodiment of the present disclosure sets forth a system including a templated DNS nameserver and a templated HTTP server. When executed on a first computing device, the templated DNS nameserver processes DNS requests by performing the steps of: receiving a DNS request specifying a domain, determining a type of the DNS request, and responding to the DNS request with a predefined IP address that is based on the type of the DNS request, the predefined IP address being associated with the templated HTTP server. When executed on a second computing device, the templated HTTP server processes HTTP requests and HTTPS requests by performing the steps of: receiving a request specifying a hostname, and responding to the HTTP request with a redirection response.

At least one technical advantage of the disclosed techniques relative to the prior art is that the disclosed techniques enable domain management and HTTP redirection without requiring multiple instances of the same configuration to be created for different domains, which is not duplicative and more efficient than prior art approaches. In addition, with the disclosed techniques, changes such as security updates can be made to a templated DNS nameserver and/or a templated HTTP server only once, in contrast to prior art approaches that required multiple instances of the same configuration to be changed for different domains. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one skilled in the art that the present disclosure may be practiced without one or more of these specific details.

As described, conventional approaches for HyperText Transfer Protocol (HTTP) redirection and domain management require multiple instances of the same or similar configuration and multiple HTTP servers to be created for different domains. In addition, any changes to the configuration needed to be made multiple times, once for each instance of the configuration.

The disclosed techniques centralize the redirection of one or more domains to another domain. In the disclosed techniques, a templated Domain Name System (DNS) nameserver and a templated HTTP server respond to DNS and HTTP and HTTPS requests, respectively. The templated DNS nameserver responds to a DNS request with a predefined response specifying an Internet Protocol (IP) address associated with the templated HTTP server, based on a type of the DNS request. The templated HTTP server responds to an HTTP or HTTPS request with a redirection response specifying a default redirection URL, or a different URL if the default is overridden. For example, the redirection response could redirect requests associated with various misspellings of a domain, and/or other domains, to the default redirection URL. As a result, domain management is simplified relative to conventional approaches, such as the method 200 described above in conjunction with FIG. 2.

In some embodiments, a new domain can simply be registered at a domain name registrar, and the templated DNS nameserver configured as an authoritative DNS nameserver at the domain name registrar. Thereafter, when a client application makes a DNS request for a domain, the DNS request is routed to the templated DNS nameserver. As described, the templated DNS nameserver responds to such a DNS request with a predefined DNS response specifying an IP address associated with the templated HTTP server, based on a type of the DNS request. Thereafter, the client application can make an HTTP or HTTPS request to the templated HTTP server using the IP address, to which the templated HTTP server responds with a redirection response specifying the default redirection URL, or a different URL if the default is overridden.

Advantageously, the techniques disclosed herein address various limitations of conventional approaches for managing domains. More specifically, techniques disclosed herein utilize a templated DNS nameserver and a templated HTTP server to enable domain management and HTTP redirection, which is not duplicative and more efficient than setting up multiple instances of the same or similar configurations and creating multiple HTTP servers for different domains. In addition, in the disclosed techniques, changes can be made once to the templated DNS nameserver and/or the templated HTTP server, rather than to multiple instances of the same or similar configurations for different domains.

System Overview

Figure 3:
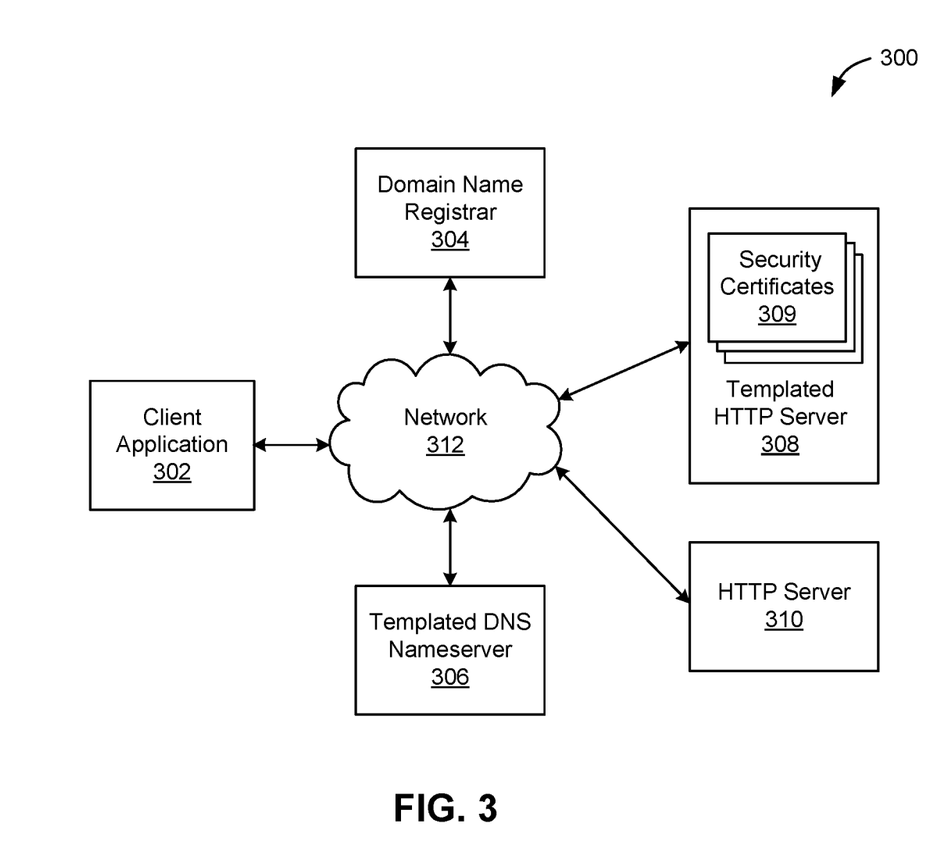
FIG. 3 is a conceptual illustration of a system that is configured to implement one or more aspect of the various embodiments.

FIG. 3 is a conceptual illustration of a system 300 that is configured to implement one or more aspects of the various embodiments. As shown, the system 300 includes a templated DNS nameserver 306, a templated HTTP server 308, an HTTP server 310, a domain name registrar 304, and a client application 302 that communicate over a network 312, such as the Internet.

The templated DNS nameserver 306 and the templated HTTP server 308 respond to DNS and HTTP/HTTPS requests, respectively, from client applications such as the client application 102. The client application 102 can be a web browser or any other technically feasible software application. As described in greater detail below in conjunction with FIG. 7, the templated DNS nameserver 306 responds to DNS requests with a predefined DNS response that includes an IP address associated with the templated HTTP server 308, based on a type of the DNS request. In that regard, the templated DNS nameserver 306 acts as an authoritative nameserver. The DNS response that includes the predefined IP address associated with the templated HTTP server 308 is a response programmed into the templated DNS nameserver 306, i.e., a predefined behavior, in contrast to conventional DNS nameservers that manage databases of mappings between domains and IP addresses. In particular, the templated DNS nameserver 306 does not explicitly handle each domain, and the templated DNS nameserver 306 does not maintain any state in a database. It should be understood that, although the templated DNS nameserver 306 implements the DNS protocol, the templated DNS nameserver 306 does not operate in the same manner as conventional DNS nameservers.

In some embodiments, the predefined DNS response that the templated DNS nameserver 306 responds with depends on a type of the DNS request that the templated DNS nameserver 306 receives, but not on the domain specified in such a DNS request. For example, the templated DNS nameserver 306 could determine that a particular DNS request is of type A, which is for an Internet Protocol version 4 (IPv4) address, and respond with a 32-bit IP address associated with the templated HTTP server 308. As another example, the templated DNS nameserver 306 could determine that a particular DNS request is of type AAAA, which is for an IPv6 address, and respond with a 128-bit Internet Protocol version 6 (IPv6) equivalent of the 32-bit IP address that is associated with the templated HTTP server 308. In addition, in some embodiments, the templated DNS nameserver 306 inserts the requested domain into appropriate parts of the predefined DNS response. For example, if a request of type A is received for example.com, the templated DNS nameserver 306 could respond with the same 32-bit IP address associated with the templated HTTP server 308 that is returned for any other domain, but with example.com inserted where required in the response record set. That is, the templated DNS nameserver 306 essentially simulates the responses of an actual DNS zone.

As described in greater detail below in conjunction with FIG. 8, the templated HTTP server 308 is configured to respond to an HTTP or HTTPS request from a client application, such as the client application 302, with (1) a redirection response to redirect to a URL associated with another HTTP server, such as the HTTP server 310 that is a conventional server hosting a website; and (2) and, in the case of an HTTPS request, a security certificate, such as a Secure Sockets Layer (SSL) certificate, that authenticates the identity of the templated HTTP server 308. As a result, the templated HTTP server 308 can redirect multiple hostnames, such as multiple misspellings of example.com, to the same URL, and the templated HTTP server 308 can handle both HTTP and HTTPS (HyperText Transfer Protocol Secure) requests. It should be understood that security certificates are only required to redirect HTTPS requests for websites that require the security certificates, but not HTTP requests. For example, to redirect example1.com to example2.com in response to a request for https://example1.com, a SSL certificate is required. In some embodiments, the templated HTTP server may not include any security certificates. In such cases, the templated HTTP server would not support HTTPS.

As a particular example, the misspellings exampel.com and exmaple.com could both be redirected to example.com by the templated HTTP server 308. Similar to the templated DNS nameserver 306, the redirection response(s) of the templated HTTP server 308 are response(s) programmed into the templated HTTP server 308, i.e., predefined behavior(s). In some embodiments, each of the redirection response(s) includes a 301 redirect response status code indicating permanent redirection from one URL to another.

In some embodiments, the templated HTTP server 308 responds with the same redirection URL, regardless of the hostname specified in the HTTP or HHPS request. In other embodiments, such a default behavior may be overridden for particular hostnames that are redirected to other URLs. For example, the templated HTTP server 308 could redirect most HTTP or HTTPS requests to example.com by default, but redirect the misspellings redirect.com and redirect.com to redirect.com instead. In yet further embodiments, the templated HTTP server 308 may drop HTTP and HTTPS requests for some hostnames that match predefined hostnames, rather than responding to such requests. For example, HTTP or HTTPS requests for a particular hostname associated with a product that has not been made public could be dropped to avoid revealing the existence of the product.

In some embodiments, the templated HTTP server 308 generates security certificates 309, which are referred to herein collectively as security certificates 309 and individually as a security certificate 309, in response to HTTPS requests for new hostnames. The templated HTTP server 308 then stores such security certificates 309 in a cache (not shown). For example, the security certificates 309 could be generated during Transport Layer Security (TLS) negotiation, which is essentially a just-in-time certificate generation, in a similar manner to the generating of the security certificate 109, described above in conjunction with FIG. 2. The security certificates 309 are used to authenticate the templated HTTP server 308. Upon receiving a subsequent HTTPS request for a hostname, the templated HTTP server 308 determines whether a security certificate associated with the hostname is stored in the cache (and has not expired if the security certificate is only valid for a set period of time), in which case the cached security certificate can be returned to the requester. On the other hand, if the security certificate associated with the hostname is not stored in the cache or a stored security certificate has expired, then a new security certificate can be generated and stored in the cache.

Although the templated HTTP server 308 implements the HTTP protocol, it should be understood that the templated HTTP server 308 does not operate in the same manner as conventional HTTP servers that host websites. For example, use of the templated HTTP server 308 in conjunction with the templated DNS nameserver 306 eliminates the need to create multiple instances of the same configuration and multiple HTTP servers for different domains. Doing so simplifies domain management and HTTP redirection relative to conventional approaches, such as those described above in conjunction with FIGS. 1-2. For example, in some embodiments, a new domain (e.g., a misspelling of example.com) can simply be registered at a domain name registrar, shown as the domain name registrar 304. Then, the templated DNS nameserver 306 can be configured as an authoritative DNS nameserver by configuring name server (NS) records at the domain name registrar 304 to point to the templated DNS nameserver 306 as a default, thereby delegating to the templated DNS nameserver 306. As described, NS records indicate which DNS nameservers are authoritative for particular domains. The NS record configured to point to the templated DNS nameserver 306 indicates to the Internet that, by default, DNS queries regarding the location of the registered domain should be sent to an IP address associated with the templated DNS nameserver 306.

Assume a client application, such as the client application 302, makes a DNS request for the registered domain to a recursive resolver. Recursive revolvers are responsible for performing recursive lookups against authoritative DNS nameservers, until a nameserver such as the templated DNS nameserver 306 is reached that can translate the domain into an IP address. The DNS request from the client application 302 will be routed by the recursive resolver to the templated DNS nameserver 306. The templated DNS nameserver 306 then responds, based on a type of the DNS request, with a predefined DNS response specifying an IP address associated with the templated HTTP server 308. Thereafter, the client application 302 can make an HTTP or HTTPS request to the templated HTTP server 308 using the associated IP addresses. As described, the templated HTTP server 308 responds to such an HTTP or HTTPS request with a redirection response specifying a default redirection URL (or a different URL if the default is overridden). For example, the redirection response can redirect requests associated with various misspellings of a domain, and/or other domains, to the default redirection URL.

For explanatory purposes only, one domain name registrar 304, one templated DNS nameserver 306, one templated HTTP server 308, one HTTP server 310, and one client application 302, are shown in FIG. 3. However, as persons skilled in the art will recognize, the system 300 may generally include any number of registrars, templated DNS nameservers, templated HTTP servers, HTTP servers, and client applications. Each of the domain name registrars, templated DNS nameservers, templated HTTP servers, HTTP servers, and client applications may run on one or more physical computing systems or virtual computing systems running in, e.g., a data center or cloud. Further, functionality of the domain name registrar 304, the templated DNS nameserver 306, the templated HTTP server 308, the HTTP server 310, and the client application 302 may be distributed across any number of other computing devices, or functionality of any number of applications may be consolidated into a single application or subsystem.

Figure 4:
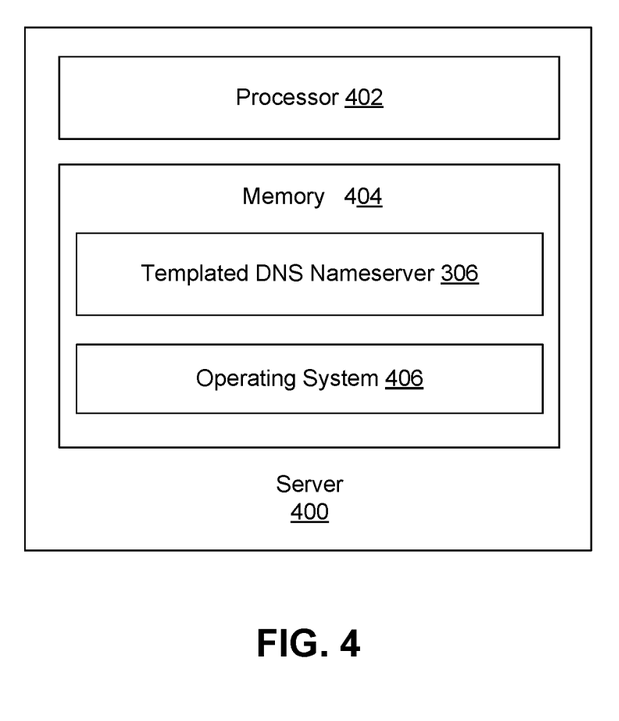
FIG. 4 is a conceptual illustration of a server in which the templated DNS nameserver of FIG. 3 is implemented, according to various embodiments.

FIG. 4 is a conceptual illustration of a server 400 in which the templated DNS nameserver 306 of FIG. 3 runs, according to various embodiments. Although described herein with respect to the server 400, it should be understood that the templated DNS nameserver 306 can generally run on any technically feasible computing device that is connected to a network, such as the Internet. As shown, the server 400 includes, without limitation, a processor 402 and a memory 404. The processor 402 may be any instruction execution system, apparatus, or device capable of executing instructions. For example, the processor 402 could comprise a central processing unit (CPU), a graphics processing unit (GPU), a controller, a microcontroller, a state machine, or any combination thereof. The memory 404 stores content, such as software applications and data, for use by the processor 402.

The memory 404 may be one or more of a readily available memory, such as random access memory (RAM), read only memory (ROM), floppy disk, hard disk, or any other form of digital storage, local or remote. In some embodiments, a storage (not shown) may supplement or replace the memory 404. The storage may include any number and type of external memories that are accessible to the processor 402. For example, and without limitation, the storage may include a Secure Digital Card, an external Flash memory, a portable compact disc read-only memory (CD-ROM), an optical storage device, a magnetic storage device, or any suitable combination of the foregoing.

As shown, the system memory 404 stores the templated DNS nameserver 306 and an operating system 406 on which the templated DNS nameserver 306 runs. The operating system 406 may be, e.g., Linux®, Microsoft Windows®, or Android™. The templated DNS nameserver 306 may be a service, application, or other type of software that runs on the operating system 406. Further, functionality of the templated DNS nameserver 306 may be distributed across multiple pieces of software in some embodiments. In some embodiments, the templated DNS nameserver 306 is configured to respond to DNS requests with a predefined DNS response that includes an IP address associated with the templated HTTP server 308 based on a type of the DNS request, as discussed in greater detail below in conjunction with FIG. 7.

Figure 5:
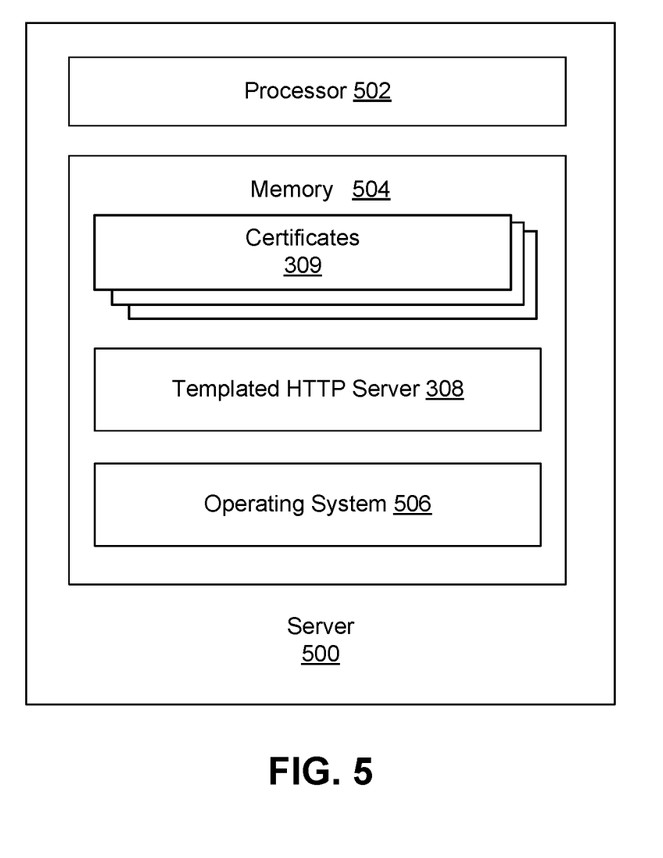
FIG. 5 is a conceptual illustration of a server in which the templated HTTP service of FIG. 3 is implemented, according to various embodiments.

FIG. 5 is a conceptual illustration of a server 500 in which the templated HTTP server 308 of FIG. 3 runs, according to various embodiments. Although described herein with respect to the server 500, it should be understood that the templated HTTP server 308 can generally run on any type of computing device that is connected to a network, such as the Internet. As shown, the server 500 includes a processor 502 and a memory 504, which may perform similar functionalities as the processor 402 and the memory 404, respectively, of the server 400 described above in conjunction with FIG. 4. In some embodiments, a storage (not shown) may supplement or replace the memory 504.

As shown, the memory 504 stores the templated HTTP server 308. In some embodiments, the templated HTTP server 308 is implemented as software. For example, the templated HTTP server 308 could be a service, application, or other type of software running on an operating system 506. Further, functionality of the templated HTTP server 308 may be distributed across multiple pieces of software in some embodiments. In some embodiments, the templated HTTP server 308 is configured to respond to HTTP and HTTPS requests with redirection responses and, in the case of HTTPS requests, one of the security certificates 309 that is either generated in response to the HTTPS requests or retrieved from a cache if the security certificate 309 was previously generated and stored in the cache (and has not yet expired), as discussed in greater detail below in conjunction with FIG. 8.

Templated Domain Management

Figure 6:
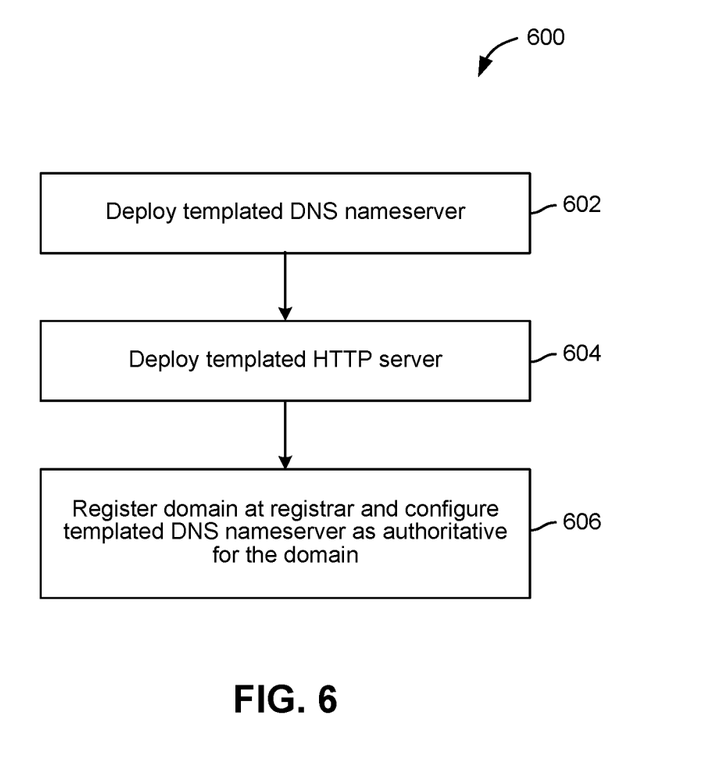
FIG. 6 is a flow diagram of method steps for deploying a templated DNS nameserver and a templated HTTP server to redirect one or more domains to another domain, according to various embodiments.

FIG. 6 is a flow diagram of method steps for deploying the templated DNS nameserver 306 and the templated HTTP server 308 to redirect one or more domains to another domain, according to various embodiments. Although the method steps are described with reference to the systems of FIGS. 3-5, persons skilled in the art will understand that any system configured to implement the method steps, in any order, falls within the scope of the present disclosure. Further, the steps of FIG. 6 may be repeated any number of times for different domains.

As shown, a method 600 begins at step 602, where the templated DNS nameserver 306 is deployed. As described, the templated DNS nameserver 306 can be a service, application, or other type of software in some embodiments. Such a templated DNS nameserver 306 can be deployed by executing the templated DNS nameserver 306 on any suitable physical or virtual computing system.

At step 604, the templated HTTP server 308 is deployed. Similar to the templated DNS nameserver 306, the templated HTTP server 308 can be a service, application, or other type of software in some embodiments. Further, the templated HTTP server 308 can be deployed by executing the templated HTTP server 308 on any suitable physical or virtual computing system.

At step 606, a domain is registered at the domain name registrar 304, and the templated DNS nameserver 306 is configured as an authoritative DNS nameserver for the domain at the domain name registrar 304. As described, the templated DNS nameserver 306 can be configured as the authoritative DNS nameserver by configuring NS records at the domain name registrar 304 to point to the templated DNS nameserver 306 as a default, thereby delegating to the templated DNS nameserver 306.

In some embodiments, a script can be executed to automatically register the domain at step 606 and configure the templated DNS nameserver 306 as the authoritative DNS nameserver. Alternatively, the domain could be manually registered at step 606, and the templated DNS nameserver 306 could be manually configured as the authoritative DNS nameserver.

Figure 7:
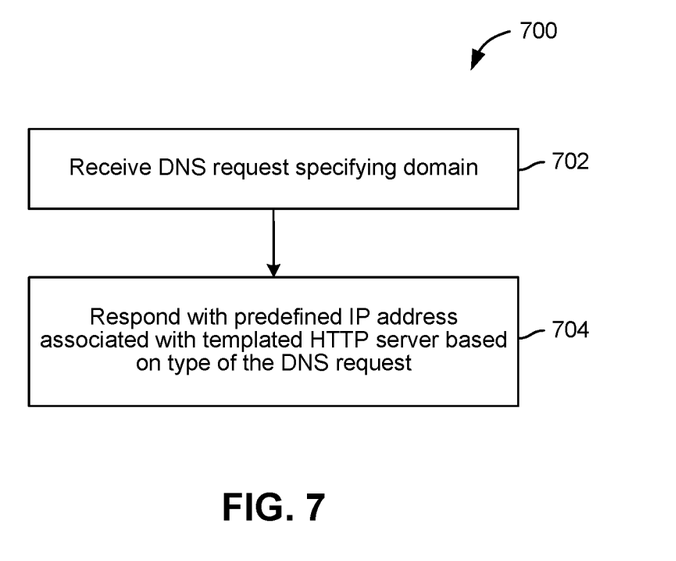
FIG. 7 is a flow diagram of method steps for responding to DNS requests, according to various embodiments.

FIG. 7 is a flow diagram of method steps for responding to requests, according to various embodiments. Although the method steps are described with reference to the systems of FIGS. 3-4, persons skilled in the art will understand that any system configured to implement the method steps, in any order, falls within the scope of the present disclosure.

As shown, a method 700 begins at step 702, where the templated DNS nameserver 306 receives a DNS request. The DNS request may specify any suitable domain, such as example.com At step 704, the templated DNS nameserver 306 responds to the DNS request with a predefined IP address associated with the templated HTTP server 308, based on a type of the DNS request. The templated DNS nameserver 306 does not perform a database lookup to determine an IP address associated with the domain specified in the DNS request, as a traditional DNS nameserver would do. Instead, the templated DNS nameserver 306 replies with the DNS response that specifies the predefined IP address and is determined based on the type of the DNS request.

As described, in some embodiments, the templated DNS nameserver 306 responds to different, standard DNS types with different IP addresses. For example, the templated DNS nameserver 306 could respond to a DNS request of type A, which is for an IPv4 address, with a 32-bit IP address associated with the templated HTTP server 308. As another example, the templated DNS nameserver 306 could respond to a DNS request of type AAAA, which is for an IPv6 address, with a 128-bit IPv6 equivalent of the 32-bit IP address that is associated with the templated HTTP server 308.

In addition, in some embodiments, the templated DNS nameserver 306 inserts the domain specified in the DNS request that is received at step 702 into appropriate parts of the DNS response at step 704. For example, if a request of type A is received for example.com, the templated DNS nameserver 306 could respond with the same 32-bit IP address associated with the templated HTTP server 308 that is returned for any other domain, but with example.com inserted where required in the response record set.

Figure 8:
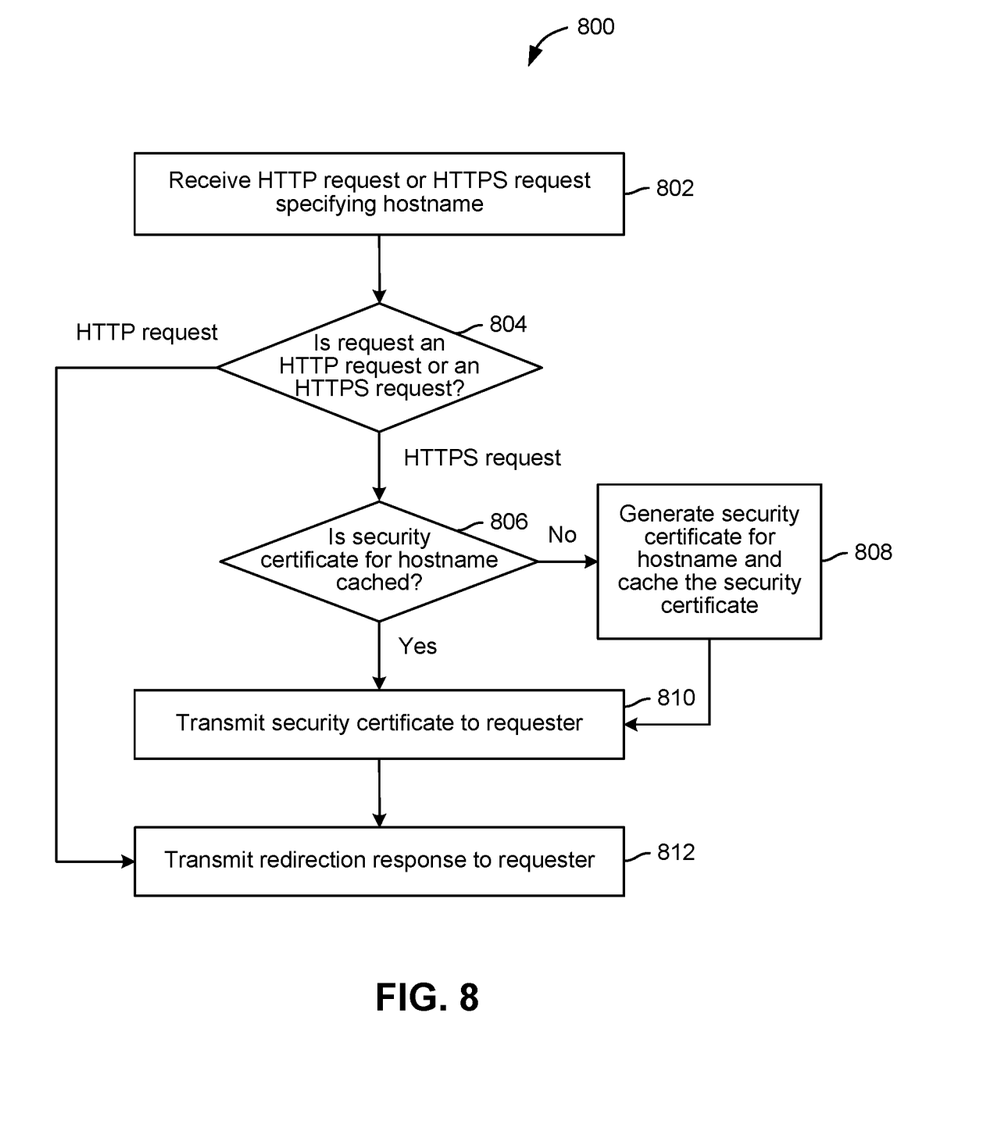
FIG. 8 is a flow diagram of method steps for responding to HTTP and HTTPS requests, according to various embodiments.

FIG. 8 is a flow diagram of method steps for responding to HTTP and HTTPS requests, according to various embodiments. Although the method steps are described with reference to the systems of FIGS. 3 and 5, persons skilled in the art will understand that any system configured to implement the method steps, in any order, falls within the scope of the present disclosure.

As shown, a method 800 begins at step 802, where the templated HTTP server 308 receives an HTTP request or an HTTPS request that includes a hostname, such as example.com.

At step 804, the templated HTTP server 308 determines whether the request is an HTTP request or an HTTPS request. As described, security certificates are required to authenticate the templated HTTP server 308 to client applications that make HTTPS requests, but security certificates are not required for HTTP requests.

If the templated HTTP server 308 determines that the request is an HTTPS request, then the templated HTTP server 308 determines whether a security certificate for the hostname has been cached at step 806. If the security certificate for the hostname has not been cached (or a cached certificate has expired), then at step 808, the templated HTTP server 308 generates a new security certificate for the hostname and caches the new security certificate. In some embodiments, the new security certificate is generated during TLS negotiation. In such cases, generating the new security certificate can include requesting a signed security certificate from a third-party certificate authority, similar to the discussion above in conjunction with FIG. 2. The certificate authority may establish proof of ownership of the hostname in any technically feasible manner. In some embodiments, an HTTP-based challenge or a DNS-based challenge may be used to prove ownership of the hostname. For example, the DNS-based challenge could require that the templated DNS nameserver 306 respond with a secret code to a DNS request by the certificate authority for the secret code, after the secret code has been provided by the templated HTTP server 308 to the templated DNS nameserver 306. In some embodiments, the templated HTTP server 308 notifies the templated DNS nameserver 306 at step 806 that (1) the templated DNS nameserver 306 will receive the DNS request for the secret code, and (2) to respond with the secret code.

If the templated HTTP server 308 determines at step 806 that a security certificate for the hostname has been cached, or after a new security certificate is generated at step 808, the templated HTTP server 308 transmits the (cached or newly-generated) security certificate to the requester at step 810.

After transmitting the security certificate to the requester, or if the templated HTTP server 308 determines at step 804 that the request is an HTTP request, the templated HTTP server 308 transmits a redirection response to the requester at 812. For example, the redirection response could be an HTTP redirect response specifying a URL to redirect to. In some embodiments, the redirection response includes a 301 redirect response status code indicating permanent redirection from one URL to another.

In some embodiments, the templated HTTP server 308 transmits the same redirection response at step 810 for every HTTP or HTTPS request that is received. In other embodiments, the templated HTTP server 308 may include rules that redirect HTTP and HTTPS requests for particular hostnames differently. For example, the templated HTTP server 308 could (1) transmit an HTTP redirect response specifying a URL of redirect.com in response to an HTTP or HTTPS request for the redirect.com; and (2) transit an HTTP redirect response specifying a default URL of example.com for other HTTP or HTTPS requests, including misspellings of example.com.

In yet further embodiments, the templated HTTP server 308 may drop HTTP and HTTPS requests for some hostnames that match predefined hostnames, rather than responding to such requests. For example, HTTP and HTTPS requests for a particular hostname associated with a product that has not been made public could be dropped to avoid revealing the existence of the product.

At least one technical advantage of the disclosed techniques relative to the prior art is that the disclosed techniques enable domain management and HTTP redirection without requiring multiple instances of the same or similar configurations to be created for different domains, which is not duplicative and more efficient than prior art approaches. In addition, with the disclosed techniques, changes such as security updates can be made to a templated DNS nameserver and/or a templated HTTP server only once, in contrast to prior art approaches that required multiple instances of the same or similar configurations to be changed for different domains. These technical advantages represent one or more technological advancements over prior art approaches.

1. In some embodiments, a computer-implemented method for processing Domain Name System (DNS) requests comprises receiving a DNS request specifying a domain, determining a type of the DNS request, and responding to the DNS request with a predefined Internet Protocol (IP) address that is based on the type of the DNS request, wherein, when responding, the domain is not mapped to the predefined IP address.

2. The computer-implemented method of clause 1, wherein the type of the DNS request is A, and the predefined IP address comprises a 32-bit IP address.

3. The computer-implemented method of clauses 1 or 2, wherein the type of the DNS request is AAAA, and the predefined IP address comprises a 128-bit Internet Protocol version 6 (IPv6) address.

4. The computer-implemented method of any of clauses 1-3, further comprising inserting the domain into one or more portions of a DNS response that includes the predefined IP address.

5. The computer-implemented method of any of clauses 1-4, wherein the predefined IP address is associated with a templated HyperText Transfer Protocol (HTTP) server that responds to HTTP requests and Hypertext Transfer Protocol Secure (HTTPS) requests with redirection responses.

6. The computer-implemented method of any of clauses 1-5, further comprising configuring a domain name registrar to delegate the domain to a templated DNS nameserver that performs the receiving, determining, and responding steps.

7. The computer-implemented method of any of clauses 1-6, further comprising configuring the domain name registrar to delegate at least one other domain to the templated DNS nameserver.

8. The computer-implemented method of any of clauses 1-7, wherein the domain includes a misspelling of another domain.

9. In some embodiments, a computer-implemented method for processing HyperText Transfer Protocol (HTTP) requests and Hypertext Transfer Protocol Secure (HTTPS) requests comprises receiving, from a client application, a first request specifying a first hostname, in response to determining that the first request is an HTTPS request determining whether the security certificate associated with the first hostname is stored in a cache and has not expired, if the security certificate is stored in the cache and has not expired, transmitting the security certificate stored in the cache and a redirection response to the client application, and if the security certificate is not stored in the cache or a stored security certificate has expired generating the security certificate, storing the security certificate in the cache, and transmitting the security certificate and the redirection response to the client application, and in response to determining that the first request is an HTTP request, transmitting the redirection response to the client application.

10. The computer-implemented method of clause 9, wherein the redirection response specifies a default Universal Resource Locator (URL) that is not determined based on the first hostname.

11. The computer-implemented method of clauses 9 or 10, wherein the redirection response specifies a Universal Resource Locator (URL) overriding a default URL that is not determined based on the first hostname.

12. The computer-implemented method of any of clauses 9-11, wherein generating the security certificate comprises requesting the security certificate from a certificate authority, and notifying a templated Domain Name System (DNS) nameserver to respond to a DNS request from the certificate authority with a secret code.

13. The computer-implemented method of any of clauses 9-12, wherein generating the security certificate comprises requesting the security certificate from a certificate authority, and satisfying a HTTP-based challenge by the certificate authority.

14. The computer-implemented method of any of clauses 9-13, wherein the receiving, determining, transmitting, and generating steps are performed by a templated HTTP server, and the client application obtains an Internet Protocol (IP) address associated with the templated HTTP server from a templated Domain Name System (DNS) nameserver that responds to DNS requests with IP addresses associated with the templated HTTP server based on types of the DNS requests.

15. The computer-implemented method of any of clauses 9-14, further comprising receiving a second request specifying a second hostname, determining that the second hostname matches a predefined hostname, and not transmitting a security certificate or redirection response in response to the second request.

16. In some embodiments, a system comprises a templated Domain Name System (DNS) nameserver that, when executed on a first computing device, processes DNS requests by performing the steps of receiving a DNS request specifying a domain, determining a type of the DNS request, and responding to the DNS request with a predefined Internet Protocol (IP) address that is based on the type of the DNS request, wherein the predefined IP address is associated with a templated HyperText Transfer Protocol (HTTP) server, and the templated HTTP server that, when executed on a second computing device, processes HTTP requests and Hypertext Transfer Protocol Secure (HTTPS) requests by performing the steps of receiving a request specifying a hostname, and responding to the request with a redirection response.

17. The system of clause 16, wherein, when templated DNS nameserver responds to the DNS request, the domain is not mapped to the predefined IP address.

18. The system of clauses 16 or 17, wherein the request is transmitted by a client application to the templated HTTP server subsequent to receiving the predefined IP address from the templated DNS nameserver.

19. The system of any of clauses 16-18, wherein a domain name registrar delegates the domain to the templated DNS nameserver.

20. The system of any of clauses 16-19, wherein the domain includes a misspelling of another domain.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
   receiving a Domain Name System (DNS) request specifying a domain; and
   sending a response including a predefined Internet Protocol (IP) address that is based on a type of the DNS request, wherein the domain specified in the DNS request is not mapped to the predefined IP address.

2. The computer-implemented method of claim 1, wherein the type of the DNS request is A, and the IP address comprises a 32-bit IP address.

3. The computer-implemented method of claim 1, wherein the type of the DNS request is AAAA, and the IP address comprises a 128-bit Internet Protocol version 6 (IPv6) address.

4. The computer-implemented method of claim 1, further comprising inserting the domain into one or more portions of a DNS response that includes the IP address.

5. The computer-implemented method of claim 1, wherein the IP address is associated with a templated HyperText Transfer Protocol (HTTP) server.

6. The computer-implemented method of claim 1, wherein the domain is delegated to a templated DNS nameserver that performs the receiving and sending steps.

7. The computer-implemented method of claim 6, wherein at least one other domain is delegated to the templated DNS nameserver.

8. The computer-implemented method of claim 7, wherein the domain includes a misspelling of another domain included in the at least one other domain.

9. One or more non-transitory computer-readable media storing instructions that, when executed by one or more processors, cause the one or more processors to perform the steps of:
   receiving a request specifying a domain; and
   transmitting a redirection response to the request, the redirection response including a predefined redirection Uniform Resource Locator (URL) that is based on a type of the request, wherein the domain specified in the request is not mapped to the predefined URL.

10. The one or more non-transitory computer-readable media of claim 9, further comprising, in response to determining that the request is a Hypertext Transfer Protocol Secure (HTTPS) request, transmitting, in addition to the redirection response, a security certificate that is associated with the domain.

11. The one or more non-transitory computer-readable media of claim 10, wherein the redirection URL is associated with an HTTP server, and the security certificate authenticates an identity of the HTTP server.

12. The one or more non-transitory computer-readable media of claim 10, further comprising generating the security certificate.

13. The one or more non-transitory computer-readable media of claim 10, further comprising requesting the security certificate from a certificate authority, and receiving the security certificate from the certificate authority.

14. The one or more non-transitory computer-readable media of claim 9, wherein:
   the receiving and transmitting steps are performed by a templated HTTP server that is associated with an Internet Protocol (IP) address, and
   the IP address associated with the templated HTTP server is received from a templated Domain Name System (DNS) nameserver that responds to DNS requests with IP addresses associated with the templated HTTP server based on types of the DNS requests.

15. The one or more non-transitory computer-readable media of claim 14, wherein the IP address associated with the templated HTTP server is associated with at least two domains that are delegated to the templated DNS nameserver.

16. The one or more non-transitory computer-readable media of claim 15, wherein a first domain of the at least two domains is a misspelling of a second domain of the at least two domains.

17. A system, comprising:
   a templated Domain Name System (DNS) nameserver that, when executed on a computing device, processes DNS requests by performing the steps of:
   receiving a DNS request specifying a domain, and responding to the DNS request with a predefined Internet Protocol (IP) address that is based on a type of the DNS request, wherein the domain specified in the DNS request is not mapped to the predefined IP address.

18. The system of claim 17, further comprising: a templated HTTP server that, when executed on a computing device, processes HTTP requests and Hypertext Transfer Protocol Secure (HTTPS) requests by performing the steps of:

receiving an HTTP request specifying a domain, and responding to the HTTP request with a redirection response.

19. The system of claim 18, wherein the IP address is associated with the templated HTTP server.

20. The system of claim 18, wherein the redirection response includes a redirection Uniform Resource Locator (URL) that is based on a type of the HTTP request and not on the domain specified in the HTTP request.

* * * * *